(12) United States Patent
Grodzki et al.

(10) Patent No.: US 10,297,023 B2
(45) Date of Patent: May 21, 2019

(54) RECONSTRUCTION OF AN IMAGE ON THE BASIS OF ONE OR MORE IMAGING MODALITIES

(71) Applicants: David Grodzki, Erlangen (DE); Arne Hengerer, Möhrendorf (DE); Michael Kaus, Nürnberg (DE); Elena Nioutsikou, Erlangen (DE); Sebastian Schmidt, Weisendorf (DE)

(72) Inventors: David Grodzki, Erlangen (DE); Arne Hengerer, Möhrendorf (DE); Michael Kaus, Nürnberg (DE); Elena Nioutsikou, Erlangen (DE); Sebastian Schmidt, Weisendorf (DE)

(73) Assignee: Siemens Healthcare GmbH, Erlangen (DE)

( * ) Notice: Subject to any disclaimer, the term of this patent is extended or adjusted under 35 U.S.C. 154(b) by 12 days.

(21) Appl. No.: 15/285,626

(22) Filed: Oct. 5, 2016

(65) Prior Publication Data

US 2017/0103523 A1    Apr. 13, 2017

(30) Foreign Application Priority Data

Oct. 9, 2015    (DE) .................. 10 2015 219 622

(51) Int. Cl.
*G06K 9/00* (2006.01)
*G06T 7/00* (2017.01)
*G06T 11/00* (2006.01)

(52) U.S. Cl.
CPC .......... *G06T 7/0012* (2013.01); *G06T 11/006* (2013.01); *G06T 11/008* (2013.01);
(Continued)

(58) Field of Classification Search
CPC .... G06T 7/0012; G06T 11/003–11/008; G06T 2207/10064–2207/10136;
(Continued)

(56) References Cited

U.S. PATENT DOCUMENTS 8,204,172 B1    6/2012    Hsieh et al.
8,948,471 B2 *  2/2015    Fichtinger .............. A61B 6/504
                                                    382/128
(Continued)

FOREIGN PATENT DOCUMENTS

DE    102011006188 A1    10/2012
DE    102011081411 B4    4/2013

OTHER PUBLICATIONS

German Office Action for German Application No. 10 2015 219 622.4, dated Jul. 1, 2016, with English Translation.
(Continued)

*Primary Examiner* — Jose L Couso
(74) *Attorney, Agent, or Firm* — Lempia Summerfield Katz LLC

(57) ABSTRACT

The embodiments relate to a reconstructing an image of an examination object, a medical imaging apparatus, and a computer program product where a first image data record is acquired with a first imaging modality and at least one further image data record of at least one further imaging modality is provided. At least one first image is reconstructed on the basis of the first image data record using the at least one further image data record.

11 Claims, 2 Drawing Sheets

(52) U.S. Cl.
CPC ............... *G06T 2207/10081* (2013.01); *G06T 2207/10088* (2013.01)

(58) Field of Classification Search
CPC ....... G06T 2207/30004; G06T 2211/40; G06T 7/0085; A61B 5/0035; A61B 5/0033; A61B 6/03–6/032; A61B 6/037; A61B 6/4417; A61B 6/5247; A61B 8/4416; A61B 8/5246; A61B 8/5261; A61B 2090/3995; G01R 33/4808–33/4814
See application file for complete search history.

(56) References Cited

U.S. PATENT DOCUMENTS

| | | | | |
|---|---|---|---|---|
| 9,390,522 | B2* | 7/2016 | Ntziachristos | G06T 11/006 |
| 9,514,530 | B2* | 12/2016 | Grady | G06T 7/0012 |
| 2007/0238957 | A1* | 10/2007 | Yared | A61B 5/0059 |
| | | | | 600/407 |
| 2009/0088620 | A1* | 4/2009 | Zagorch Ev; Lyubomir | A61B 6/5247 |
| | | | | 600/407 |
| 2009/0161933 | A1* | 6/2009 | Chen | G06T 11/006 |
| | | | | 382/131 |
| 2010/0128958 | A1* | 5/2010 | Chen | A61B 6/032 |
| | | | | 382/132 |
| 2010/0310144 | A1* | 12/2010 | Chen | G06T 11/006 |
| | | | | 382/131 |
| 2011/0044546 | A1* | 2/2011 | Pan | G06T 11/006 |
| | | | | 382/195 |
| 2011/0286646 | A1* | 11/2011 | Chen | G06T 11/006 |
| | | | | 382/131 |
| 2012/0265050 | A1* | 10/2012 | Wang | A61B 5/055 |
| | | | | 600/411 |
| 2013/0049752 | A1 | 2/2013 | Hutter et al. | |
| 2013/0267841 | A1 | 10/2013 | Vija | |
| 2013/0343673 | A1* | 12/2013 | Pal | G06T 11/003 |
| | | | | 382/298 |
| 2014/0003688 | A1* | 1/2014 | Hansis | A61B 6/032 |
| | | | | 382/130 |
| 2015/0011865 | A1 | 1/2015 | Goldhaber | |
| 2015/0310653 | A1* | 10/2015 | Knoll | G06T 11/003 |
| | | | | 382/131 |
| 2016/0291105 | A1* | 10/2016 | Knoll | A61B 6/4417 |
| 2016/0310761 | A1* | 10/2016 | Li | A61N 5/1038 |
| 2017/0238882 | A1* | 8/2017 | Ma | A61B 6/032 |

OTHER PUBLICATIONS

Fessler, Jeffrey A., "Reconstruction methods for under-sampled MR data aka: Constrained reconstruction methods." Dept. of Radiology University of Michigan (May 2011).

* cited by examiner

RECONSTRUCTION OF AN IMAGE ON THE BASIS OF ONE OR MORE IMAGING MODALITIES

This application claims the benefit of DE 10 2015 219 622.4, filed Oct. 9, 2015, which is hereby incorporated by reference in its entirety.

TECHNICAL FIELD

The embodiments relate to a method for reconstructing an image of an examination object, a medical imaging apparatus and a computer program product.

BACKGROUND

Different modalities are used in medical imaging. The important modalities are, for instance, ultrasound, computed tomography (CT), or magnetic resonance tomography (MRT). Depending on the clinical application and situation, the best suited imaging modality may be used.

With the acquisition of image data, the imaging modalities use different methods. During the acquisition, a measured data space may be filled with data that is required to calculate an image, and the image is calculated thereupon. With MRT, a Fourier space, which may also be referred to as k-space or spatial frequency space, may be filled with data and an image is produced therefrom by Fourier transformation. The size of the measured data space, in other words the number of data points to be acquired, may be determined by parameters such as resolution, matrix size, slice thickness, and number of slices. The measurement time required for the acquisition may be proportional to the size of the measured data space.

It is advantageous for many applications to keep the measurement time as minimal as possible, in order, for instance, to keep the dosage low or to be able to display rapidly occurring processes.

SUMMARY AND DESCRIPTION

The scope of the present invention is defined solely by the appended claims and is not affected to any degree by the statements within this summary. The present embodiments may obviate one or more of the drawbacks or limitations in the related art.

With the present embodiments, a method, an apparatus, and a computer program product are to be provided, which may permit an advantageous, quicker, and/or higher-quality generation of an image of an examination object.

Accordingly, a method for reconstructing an image of an examination object is proposed that includes the following acts. With a first imaging modality, a first image data record of the examination object is acquired. Moreover, at least one further image data record of the examination object is provided to at least a further imaging modality. The first image data record acquired and the at least one further image data record provided may be transferred to a reconstruction unit. On the basis of the first image data record, at least one first image is reconstructed by the reconstruction unit using the at least one further image data record, e.g., with the reconstruction of the at least one first image from the data of the first image data record, reference is also made to the data of the at least one further image data record.

To reconstruct the at least one first image, a larger database may thus be accessed than was possible solely on the basis of the first image data record. This in turn allows for the calculation of higher-quality images, by them showing minimal artifacts for instance.

The examination object may be a body part of a patient for instance. The acquisition of the first image data record may take place using a first medical imaging apparatus, which is embodied to carry out the first imaging modality.

The first imaging modality advantageously differs from the at least one further imaging modality, e.g., the first imaging modality is an imaging modality that differs from the at least one further imaging modality.

Conceivable imaging modalities may be magnetic resonance tomography (MRT) and/or radiography and/or computed tomography (CT) and/or digital volume tomography (DVT), e.g., cone beam CT (CBCT) and/or mammography and/or magnetic resonance/positron emission tomography (MT/PET) and/or positron emission tomography/computed tomography (PET/CT) and/or scintigraphy and/or sonography and/or thermography and/or electric impedance tomography (EIT).

The at least one further imaging modality may include the first imaging modality. The at least one further imaging modality may also include one or a number of imaging modalities that differ from the first. The at least one further imaging modality may also include the first imaging modality and one or a number of imaging modalities that differ from the first.

An image data record may include values, which reflect information relating to a structure and/or a state of the examination object. The values may be measured values, which are captured by a medical imaging apparatus. For instance, in the case of a MRT, the image data record may include a Fourier space filled with measured values.

The provision of the at least one further image data record may include an acquisition of the at least one further image data record. This acquisition may take place with at least one further medical imaging apparatus, which is embodied to carry out at least one further imaging modality. It is also conceivable however for this acquisition to take place with the first medical imaging apparatus, provided this is embodied to carry out the at least one further imaging modality.

The acquisition of the at least one further image data record may take place before or after the acquisition of the first image data record in terms of time. A simultaneous acquisition of the image data records is also conceivable, particularly if the acquiring medical imaging apparatus is embodied to perform a number of imaging modalities.

Moreover, the provision of the at least one further image data record may include a reading-in of an image data record that is already available. For instance, a CT may first be used to generate a further image data record, which is then stored on a data storage medium and subsequently provided by this by loading into the reconstruction unit.

With the reconstruction of the at least one first image on the basis of the first image data record by Fourier transformation of a Fourier space in MRT, in addition to the first image data record the at least one further image data record provided, which may include CT data for instance, is processed.

One embodiment provides that the first image data record has a first orientation, the at least one further image data record has at least one further orientation and the first orientation and the at least one further orientation are matched.

In particular, the first image data record is linked to a first spatial coordinate system and the at least one further image data record is linked to at least one further coordinate system. By transforming the coordinate systems, the orientations may be matched to one another so that the data records have the same spatial reference system. As a result, the at least one further image data record may easily be used in the reconstruction of at least one first image.

The first image data record may have an undersampling, e.g., the data record actually required for the reconstruction is not completely filled.

For instance, a sparse measured data matrix, (e.g., a sparse Fourier space matrix), is obtained in MRT by undersampling the first image data record. As a result, the acquisition of the measured data may take place more quickly, since all entries of the measured data matrix are no longer captured, but instead just one part thereof. With an undersampling factor n, e.g., only on average each $n^{th}$ matrix element is scanned, a similarly large acceleration factor n may be produced, e.g., in terms of time only the $n^{th}$ part is still required to capture the measured data. The undersampling factor used in this method advantageously is at least two, at least three, or at least four. With the acquisition of the measured data, parallel acquisition techniques (PAT) may also be used in MRT for instance. Methods of this type allow for largely or completely artifact-free images to be generated in spite of the undersampled acquisition.

In a further aspect of the embodiments, the reconstruction includes an iterative reconstruction. Particularly with undersampled image data records, higher-quality images may be generated by iterative reconstruction.

With the iterative reconstruction, a prior knowledge, what is known as a-priori knowledge, may be used to iteratively determine as well as possible missing measured data of the image data record. For instance, assumptions may be made as a-priori knowledge, such as for instance that the examination object has a head shape.

The at least one further image data record may be used as a-priori knowledge for the iterative reconstruction. Useful information may thus be derived from the at least one further image data record for the iterative reconstruction, in order to increase the quality of the resulting at least one first image.

In particular, the at least one further image data record may include an item of contrast information, which is used as a-priori knowledge for the iterative reconstruction. The contrast information may be determined in particular from at least one further image, which may be derived from the at least one further image data record. The fact that contrasts of images of different imaging modalities may be very different may be utilized advantageously here.

The contrast information may include at least one outline of the examination object. In particular, external delineations of the examination object, such as, e.g., a head shape, may be used. Moreover, the contrast information may include at least one edge of a tissue structure of the examination object. An edge of a tissue structure may separate two planar tissue areas, e.g. they identify a transition area from one tissue area into another. In particular, high-frequency parts of the further images may be taken into consideration, which may be characteristic of edges within the further images, while the lower frequencies of the further images, which may determine a contrast strength, are not taken into consideration.

One embodiment provides that the a-priori knowledge includes display information for evaluating the contrast information. Such display information may include prior knowledge for instance relating to the contrast displays dependent on the imaging modality, e.g., that bone tissue may be marked dark in MRT, whereas it may be marked light in CT.

Moreover, it is proposed that a segmentation is carried out on the basis of the at least one further image data record and by the segmentation an item of segmentation information is derived that is used as a-priori knowledge. At least one further image, to which the segmentation is applied, may thus be generated for instance from the at least one further image data record.

With a segmentation of the further image, regions, in particular body regions, that may be connected in terms of content, are established by combining adjacent pixels or voxels for instance. This may take place, inter alia, on the basis of a homogeneity criterion and/or a threshold value. For instance, a value "0" may be assigned to all pixels of the further image, which lie below a certain threshold value, whereas a value "1" is assigned to all pixels above a certain threshold value.

The segmentation information may include an assignment of segments to tissue types. Different tissue types of an examination object, to which signal intensities and/or density values may then be assigned for instance, may thus be identified.

It is also proposed that the first image data record includes measured data from a first field of view (FOV) and the at least one further image data record includes measured data from at least one further field of view, wherein the at least one further field of view includes at least one additional area that is not included by the first field of view. In particular, the further field of view may include the first field of view completely, so that the further field of view represents a real superset of the first field of view and is thus larger than the first field of view. The at least one additional field of view may directly border the first field of view.

If the further field of view includes at least one additional area, data from the at least one additional field of view may be used to reconstruct the at least one first image on the basis of the first image data record. A higher image quality may thus be achieved above all in external areas of the at least one first image.

One embodiment provides that the method includes an additional act, in which the at least one image is displayed. In particular, further image data that is generated on the basis of the at least one further image data record is displayed together with the at least one first image. As a result, the diagnostic reliability of the resulting display may be increased.

For instance, the at least one first image may be displayed in the center of the display and image data based on the at least one further image data record may be displayed peripherally.

Furthermore, a medical imaging apparatus of a first imaging modality is proposed, which is embodied to perform a method for reconstructing an image of an examination object. The medical imaging apparatus advantageously includes an acquisition unit for the acquisition of a first image data record with the first imaging modality, a provisioning unit for the provision of at least one further image data record of at least one further imaging modality, and a reconstruction unit for the reconstruction of at least one first image on the basis of the first image data record using the at least one further image data record.

The advantages of the embodiments of the medical imaging apparatus correspond to the advantages of the method for reconstructing an image of an examination object, which is cited in detail above. Features, advantages, or alternative embodiments mentioned herein may also be transferred similarly to the other objects and vice versa.

Furthermore, a computer program product is proposed that includes a program and is directly loadable into a memory store of a programmable system control unit of a medical imaging apparatus and has program elements, for example, libraries and auxiliary functions, in order to perform a method when the computer program product is executed in the system control unit of the medical imaging apparatus. The computer program product may include an item of software with a source code that is compiled and linked or is interpreted, or an executable software code which, for execution, is loaded into the system control unit. By the computer program product, the method may be performed rapidly, exactly reproducibly and robustly. The computer program product is configured so that it may perform the method acts by the system control unit. The system control unit has the pre-conditions in each case such as, for example, a suitable working memory store, a suitable graphics card or a suitable logic unit so that the respective method acts may be performed efficiently. The computer program product is stored, for example, on a computer-readable medium or is deposited on a network or server from where it may be loaded into the processor of a local system control unit that may be directly connected to the medical imaging apparatus or configured as part of the medical imaging apparatus. Furthermore, control information of the computer program product may be stored on an electronically readable data storage medium. The items of control information of the electronically readable data storage medium may be configured so that they carry out a method when the data storage medium is used in a system control unit of a medical imaging device. Examples of electronically readable data storage media are a DVD, a magnetic tape, or a USB stick, on which electronically readable control information, in particular software, is stored. If this control information is read from the data storage medium and stored in a system control unit of the medical imaging apparatus, all the embodiments of the above-described methods may be carried out. The embodiments may therefore also start from the aforementioned computer-readable medium and/or the aforementioned electronically readable data storage medium.

BRIEF DESCRIPTION OF THE DRAWINGS

Further advantages, features and details of the embodiments are disclosed in the following description and by reference to the drawings. Parts that correspond to one another are provided with the same reference signs in all the figures, in which.

DETAILED DESCRIPTION

Figure 1:
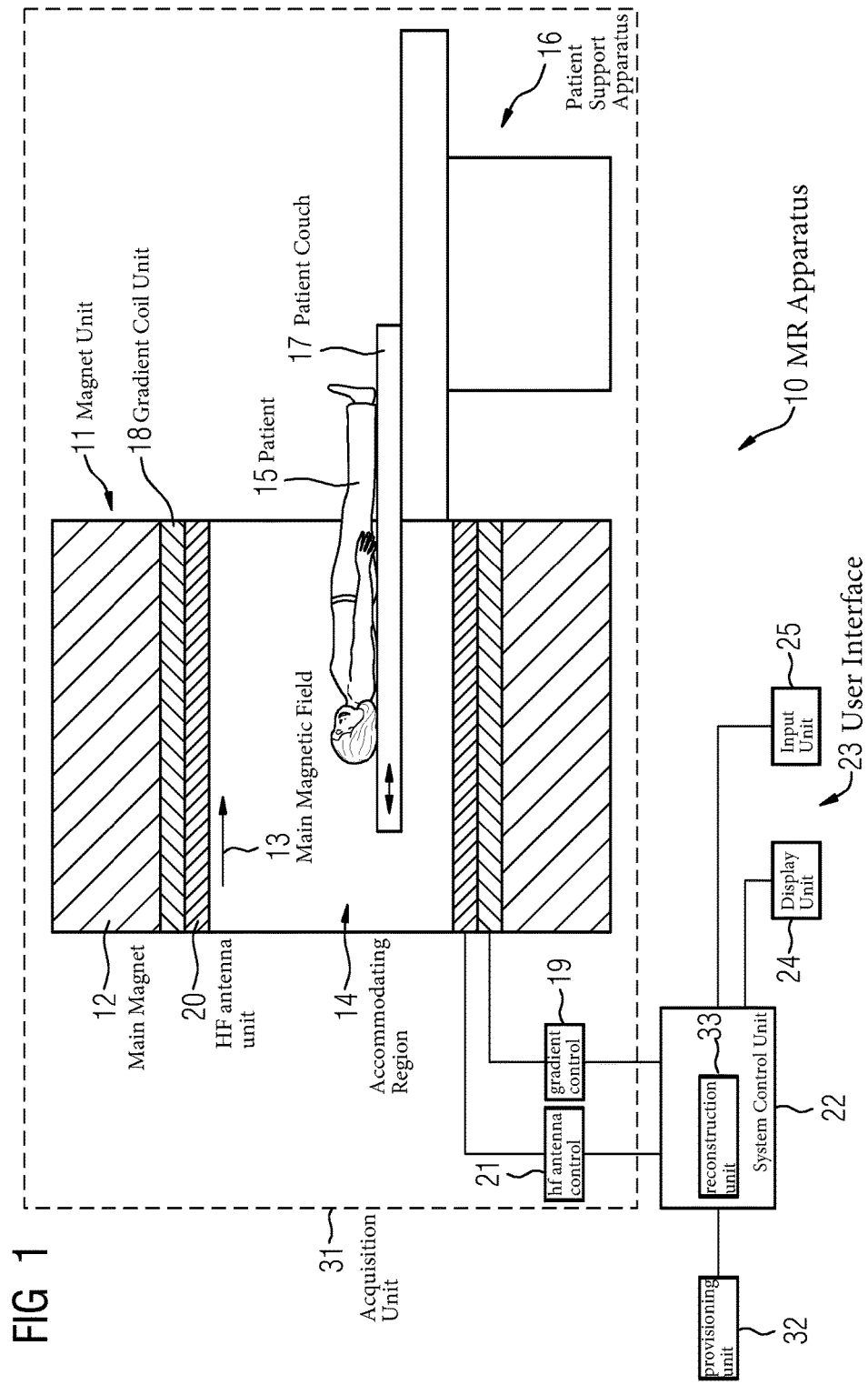
FIG. 1 depicts a schematic representation of a medical imaging apparatus according to an embodiment.

For an exemplary imaging modality, FIG. 1 depicts a schematic representation of a magnetic resonance apparatus 10 as a medical imaging apparatus for carrying out magnetic resonance tomography (MRT). Further possible imaging modalities are for instance radiography and/or computed tomography (CT) and/or digital volume tomography (DVT, in particular CBCT) and/or mammography and/or magnetic resonance/positron emission tomography (MT/PET) and/or positron emission tomography/computed tomography (PET/CT) and/or scintigraphy and/or sonography and/or thermography and/or electric impedance tomography (EIT).

The magnetic resonance apparatus 10 includes a magnet unit 11 that has a superconducting main magnet 12 for generating a strong and, particularly, temporally constant main magnetic field 13. In addition, the magnetic resonance apparatus 10 has a patient accommodating region 14 to accommodate a patient 15. In the present exemplary embodiment, the patient accommodating region 14 is configured to be cylindrical and is surrounded cylindrically in a peripheral direction by the magnet unit 11. In principle, however, a configuration of the patient accommodating region 14 deviating therefrom is readily conceivable. The patient 15 may be pushed by a patient support apparatus 16 of the magnetic resonance apparatus 10 into the patient accommodating region 14. For this purpose, the patient support apparatus 16 has a patient couch 17 that is configured to be movable within the patient receiving area 14.

The magnet unit 11 also has a gradient coil unit 18 for generating magnetic field gradients that are used for position encoding during imaging. The gradient coil unit 18 is controlled by a gradient control unit 19 of the magnetic resonance apparatus 10. The magnet unit 11 further includes a high frequency antenna unit 20 that is configured in the present exemplary embodiment as a body coil that is firmly integrated into the magnetic resonance apparatus 10. The high frequency antenna unit 20 is configured for excitation of atomic nuclei, which occurs in the main magnetic field 13 generated by the main magnet 12. The high frequency antenna unit 20 is controlled by a high frequency antenna control unit 21 of the magnetic resonance apparatus 10 and radiates HF magnetic resonance sequences into an examination space that is substantially formed by a patient accommodating region 14 of the magnetic resonance apparatus 10. The high frequency antenna unit 20 is also configured for the receiving of magnetic resonance signals.

For controlling the main magnet 12, the gradient control unit 19 and for controlling the high frequency antenna control unit 21, the magnetic resonance apparatus 10 has a system control unit 22. The system control unit 22 centrally controls the magnetic resonance apparatus 10, such as, for example, the performance of a predetermined imaging gradient echo sequence. Furthermore, the magnetic resonance apparatus 10 includes a user interface 23, which is connected to the system control unit 22. Control information such as, for example, imaging parameters and reconstructed magnetic resonance images may be displayed on a display unit 24, for example, on at least one monitor, of the user interface 23 for medical operating personnel. In addition, the user interface 23 has an input unit 25 that information and/or parameters may be input by the medical operating personnel during a scanning procedure.

The magnetic resonance apparatus further includes an acquisition unit 31 for acquiring a first image data record with the first imaging modality. The acquisition unit 31 includes a number of units, which were explained in detail above.

The magnetic resonance apparatus also includes a provisioning unit 32 for providing at least one further image data record of at least one further imaging modality and a reconstruction unit 33 for reconstructing at least one first image on the basis of the first image data record using the at least one further image data record.

The provisioning unit 32 may be, for instance, an interface to a data network, in particular, a medical information system (MIS) and/or a radiology information system (RIS), from which the at least one further image data record may be retrieved. It may also be a local data storage medium, on which the at least one further image data record is stored. The at least one further image data record may be transmitted to the reconstruction unit 33 in a wired and/or wireless manner for instance.

In this example the system control unit 22 includes the reconstruction unit 33. In order to carry out the reconstruction, the reconstruction unit 33 may access a program memory unit and a processor unit, which the software and/or computer programs deposited in the program memory unit are executed. In particular, a computer program product may thus be executed, inter alia, a method according to FIGS. 2 and/or 3 may be carried out.

Figure 2:
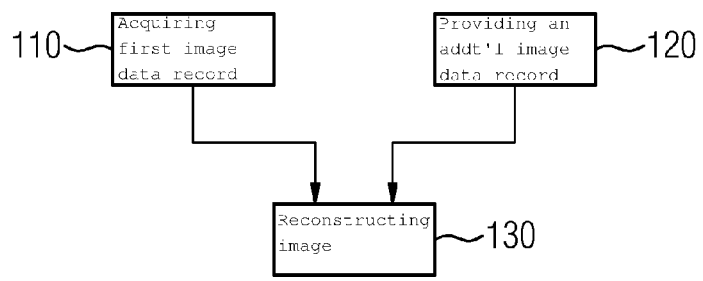
FIG. 2 depicts a schematic block diagram of a method according to an embodiment.
Figure 3:
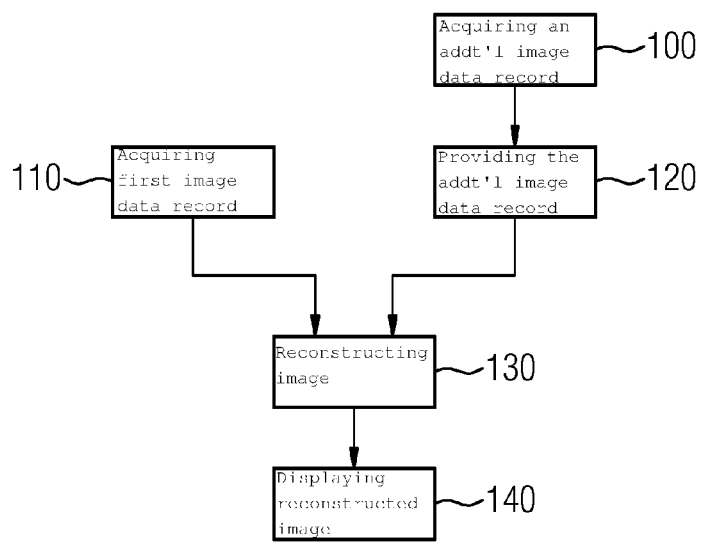
FIG. 3 depicts a schematic block diagram of an extended method according to an embodiment.

FIG. 2 depicts a method, in which, in act 110, an acquisition of a first image data record is carried out with a first imaging modality, such as, e.g., MRT. In act 120, at least one further image data record of at least one further imaging modality, such as, e.g., CT, which advantageously differs from the first imaging modality, is provided. The at least one further image data record may be generated for instance prior to or also after act 110. An acquisition act 100 is extended by way of example in FIG. 3, in which the at least one further image data record is captured. Particularly for combined imaging modalities, such as MR/PET and/or PET/CT, it is however also conceivable for the acquisition of the first image data record and the at least one further image data record to take place at the same time.

In act 130, a reconstruction, in particular an iterative reconstruction, of at least one first image takes place on the basis of the first image data record using the at least one further image data record. In act 140, such as is displayed by way of example in FIG. 3, the at least one first image may be displayed.

A-priori knowledge may be derived from the at least one further image data record and is then used for the iterative reconstruction on the basis of the first image data record. As a result, the quality of the at least one first image may be optimized and/or the acquisition of the first image data record may be accelerated. The acceleration may take place by undersampling, for instance by a Fourier space matrix not being scanned continuously, but instead only intermittently.

In most cases at least one further image may be generated from the at least one further image data record. This at least one further image may have contrasts, from which contrast information may be derived as a-prior knowledge for the reconstruction of the at least one first image on the basis of the first image data record.

For instance, outlines and/or external delineations of the patient 15, e.g., the shape of the head or a leg, may be used. Furthermore, edges, in particular derivable from high-frequency parts of the at least one further image, may be taken into account, for instance, in differentiation from low frequencies of the image, which primarily determine a contrast intensity. By the edges, tissue structures within the external delineations of the patient may be established and made available as a-priori knowledge.

Prior knowledge about special contrasts may serve as further a-priori knowledge, such as, e.g., that bones may be marked dark in a MRT image, whereas a light display may be in a CT image.

Furthermore, the at least one further image may be segmented in order to generate a-priori knowledge, e.g., an item of segmentation information is generated as a-priori knowledge on the basis of the at least one further image data. As a result, different tissue types may be identified, to which signal intensities and/or density values may then be assigned for instance.

An image data record, on the basis of which an image is generated, may thus be acquired from a MRT for instance. In this image, bones, air, lungs, fat, and/or soft tissue parts may be identified for instance and provided for a reconstruction of CT measured data with output values, (e.g., +1000 Hounsfield units (HU), −1000 HU, −500 HU, −75 HU, and +40 HU), which are iteratively corrected below. In this example, CT thus represents the first imaging modality, and MRT the further imaging modality. Segmentation information, which is used as a-priori knowledge for the iterative reconstruction of the CT image data record, in other words the first image data record, is derived from the MRT image data record, in other words the further image data record.

Figure 4:
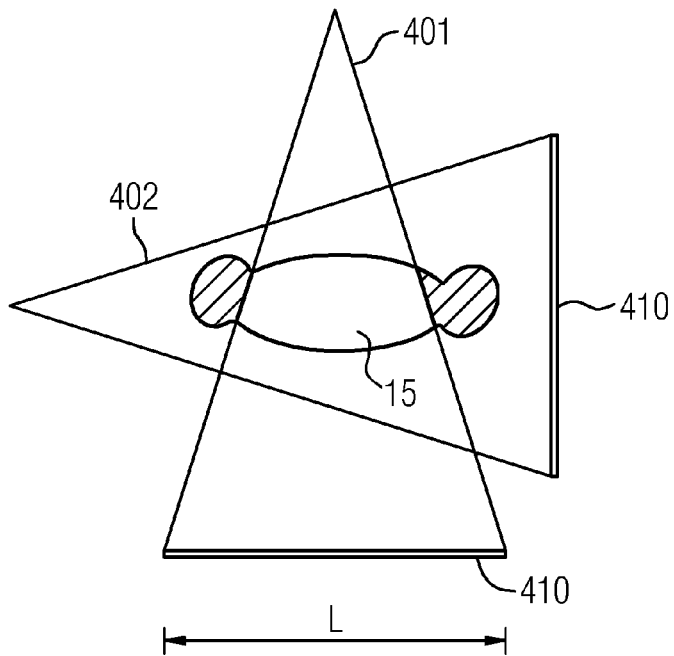
FIG. 4 depicts a schematic cross-sectional representation of different projection coverages according to an embodiment.

If a larger field of view is covered by the at least one further image data record than by the first image data record, data from the field of view, which is covered by the further field of view but not by the first field of view, may be used to generate a-priori knowledge. With the aid of FIG. 4, such a case is illustrated by way of example on the basis of a cone beam CT (CBCT), which displays a form of digital volume tomography (DVT). Measured data may be captured when a CBCT is carried out over a range of 360° of a patient 15, who is depicted here cross-sectionally, e.g., a number of cone beam projections are carried out over the entire range of the patient. To generate a cone beam projection, the patient 15 is irradiated using x-rays, wherein the x-rays cover a conical irradiation volume. Two differently oriented irradiation volumes are depicted by way of example in FIG. 4, namely a frontal irradiation volume 401 and a lateral irradiation volume 402.

In order to acquire an image data record, a detector 410 captures a signal distribution of the irradiated x-rays in different orientations in each case. The detector has a limited expansion L, e.g., 40×40 cm$^2$, so that the irradiation volumes 401, 402 are thus also limited. This results in the frontal irradiation volume 401 not covering a part of the body of the patient 15, which is depicted here shaded, e.g., the parts of the patient have no 360° projections available. On account of this undercoverage, possible images cannot be reconstructed exactly from the acquired image data record. Methods are known, however, with the aid of which images may be reconstructed from this incomplete image data record, but these images may be defective. These errors may be corrected on the basis of a further image data record of a further imaging modality.

For instance, MRT image data records often have a larger field of view than CBCT image data records. In respect of FIG. 4, it is conceivable that a MRT image data record covers a field of view that includes the entire volume of the patient 15. An improved image quality is thus possible particularly in external areas, here in particular in the shaded areas of the patient 15.

The method is clarified further on the basis of exemplary embodiments. For instance, a MRT may first be performed within the scope of radiotherapy of a patient in act 100 for irradiation planning. To carry out an irradiation of the patient in an irradiation apparatus, this includes a CBCT apparatus for patient positioning. A first image data record may be acquired in act 110 with the aid of the CBCT apparatus. In order to improve the quality and/or the acquisition time of the CBCT, at least one first image is reconstructed in this example in act 130 on the basis of the first image data record by iterative reconstruction. In this way a further image data record from the MRT carried out in act 100 is used as a-priori knowledge, which is provided in act 120.

In a further example, a MR/PET image is generated from a MR/PET image data record by iterative reconstruction, wherein an attenuation correction is carried out. If a CT recording is available as a further image data record, a bone segmentation may be carried out with the aid thereof. The segmentation information resulting therefrom may then be used as a-priori knowledge to improve and/or accelerate the attenuation correction and thus to reconstruct the MR/PET image.

The above-described method may be implemented via a computer program product including one or more readable storage media having stored thereon instructions executable by one or more processors of the computing system. Execution of the instructions causes the computing system to perform operations corresponding with the acts of the method described above.

The instructions for implementing processes or methods described herein may be provided on computer-readable storage media or memories, such as a cache, buffer, RAM, FLASH, removable media, hard drive, or other computer readable storage media. A processor performs or executes the instructions to train and/or apply a trained model for controlling a system. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

Finally, the above method, as described in detail, and the illustrated medical imaging apparatus are only exemplary embodiments that may be modified by the person skilled in the art in a wide variety of ways without departing from the scope of the embodiments. It is therefore intended that the foregoing description be regarded as illustrative rather than limiting, and that it be understood that all equivalents and/or combinations of embodiments are intended to be included in this description. Further, the use of the indefinite article "a" or "an" does not preclude that the relevant features may also be present plurally. Similarly, the expression "unit" does not exclude the relevant component including a plurality of interacting partial components that may possibly also be spatially distributed.

The invention claimed is:

1. A method for reconstructing an image of an examination object, the method comprising:
   acquiring, by a medical imaging apparatus of a first imaging modality, a first image data record of the examination object, wherein the first image data record comprises measured data from a first field of view, and wherein the first image data record has an undersampling;
   providing, by the medical imaging apparatus, at least one further image data record of the examination object of at least one further imaging modality, wherein the at least one further imaging modality is an imaging modality that differs from the first imaging modality, wherein the at least one further image data record comprises measured data from at least one further field of view, and wherein the at least one further field of view comprises at least one additional area that is not comprised by the first field of view;
   reconstructing, by the medical imaging apparatus, at least one first image based on the first image data record using the at least one further image data record by a reconstruction unit, wherein the reconstructing comprises an iterative reconstruction with the at least one further image data record of the at least one further imaging modality used as a-priori knowledge for the iterative reconstruction; and
   displaying, by a display, the reconstructed at least one first image.

2. The method of claim 1, wherein the first image data record has a first orientation, the at least one further image data record has at least one further orientation, and the first orientation and the at least one further orientation are matched.

3. The method of claim 1, wherein the at least one further image data record comprises an item of contrast information, which is used as a-priori knowledge for the iterative reconstruction.

4. The method of claim 3, wherein the contrast information comprises at least one outline of the examination object, at least one edge of a tissue structure of the examination object, or a combination thereof.

5. The method of claim 3, wherein the a-priori knowledge comprises display information for evaluating the contrast information.

6. The method of claim 1, wherein a segmentation is carried out based on the at least one further image data record, and
   wherein an item of segmentation information used as a-priori knowledge is derived by the segmentation.

7. The method of claim 6, wherein the segmentation information comprises an assignment of segments to tissue types.

8. The method of claim 6, wherein a further segmentation is carried out based on the first image data record, and
   wherein the first image data record is based on the segmentation information derived from a segmentation based on the at least one further image data record.

9. The method of claim 1, wherein the first imaging modality or the at least one further imaging modality comprises at least one of radiography, computed tomography (CT), digital volume tomography (DVT), mammography, magnetic resonance tomography (MRT), magnetic resonance/positron emission tomography (MT/PET), positron emission tomography/computed tomography (PET/CT), scintigraphy, sonography, thermography, or electric impedance tomography (EIT).

10. A medical imaging apparatus of a first imaging modality, the medical imaging apparatus comprising:
at least one controller configured to:
acquire a first image data record with the first imaging modality, wherein the first image data record comprises measured data from a first field of view, and wherein the first image data record has an undersampling;
provide at least one further image data record of a further imaging modality, wherein the further imaging modality is an imaging modality that differs from the first imaging modality, wherein the at least one further image data record comprises measured data from at least one further field of view, and wherein the at least one further field of view comprises at least one additional area that is not comprised by the first field of view;
reconstruct at least one first image based on the first image data record using the at least one further image data record, wherein the reconstructing comprises an iterative reconstruction with the at least one further image data record of the further imaging modality used as a-priori knowledge for the iterative reconstruction; and
a display configured to display the reconstructed at least one first image.

11. A non-transitory computer readable medium storing thereon a computer program, which when executed by a computer, causes a medical imaging apparatus to at least perform:
acquire a first image data record of the examination object with a first imaging modality, wherein the first image data record comprises measured data from a first field of view, and wherein the first image data record has an undersampling;
provide at least one further image data record of the examination object of at least one further imaging modality, wherein the at least one further imaging modality is an imaging modality that differs from the first imaging modality, wherein the at least one further image data record comprises measured data from at least one further field of view, and wherein the at least one further field of view comprises at least one additional area that is not comprised by the first field of view;
reconstruct at least one first image based on the first image data record using the at least one further image data record by a reconstruction unit, wherein the reconstructing comprises an iterative reconstruction with the at least one further image data record of the at least one further imaging modality used as a-priori knowledge for the iterative reconstruction; and
display the reconstructed at least one first image.

* * * * *